United States Patent
Foxenland

(10) Patent No.: US 7,812,814 B2
(45) Date of Patent: Oct. 12, 2010

(54) DEVICE WITH GAME-DEPENDENT USER INTERFACE, METHOD, GAME MODULE AND COMPUTER PROGRAM PRODUCT THEREFOR

(75) Inventor: Eral Foxenland, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 491 days.

(21) Appl. No.: 10/587,991

(22) PCT Filed: Dec. 30, 2004

(86) PCT No.: PCT/EP2004/053736

§ 371 (c)(1),
(2), (4) Date: Jul. 28, 2006

(87) PCT Pub. No.: WO2005/075038

PCT Pub. Date: Aug. 18, 2005

(65) Prior Publication Data

US 2008/0030455 A1 Feb. 7, 2008

Related U.S. Application Data

(60) Provisional application No. 60/541,815, filed on Feb. 4, 2004.

(30) Foreign Application Priority Data

Jan. 28, 2004 (EP) .................................. 04445006

(51) Int. Cl.
*A63F 13/00* (2006.01)

(52) U.S. Cl. ...................... 345/156; 715/765; 715/864; 715/866; 463/29

(58) Field of Classification Search ................. 345/156; 715/765, 866, 864; 463/29
See application file for complete search history.

(56) References Cited

U.S. PATENT DOCUMENTS

| 6,091,411 A | 7/2000 | Straub et al. ................. 345/333 |
| 6,336,865 B1 * | 1/2002 | Kinjo ........................... 463/34 |
| 7,032,229 B1 * | 4/2006 | Flores et al. ................. 719/328 |
| 2002/0132610 A1 | 9/2002 | Chaplin et al. .............. 455/414 |
| 2002/0142792 A1 | 10/2002 | Martinez ..................... 455/550 |
| 2004/0121837 A1 * | 6/2004 | Chiang et al. ................. 463/24 |
| 2004/0157654 A1 * | 8/2004 | Kataoka et al. ................ 463/4 |
| 2004/0216054 A1 * | 10/2004 | Mathews et al. ............ 715/765 |
| 2005/0287925 A1 * | 12/2005 | Proch et al. ................. 446/470 |

FOREIGN PATENT DOCUMENTS

WO WO 95/31773 A1 11/1995

OTHER PUBLICATIONS

International Search Report dated May 16, 2006 for corresponding PCT application No. PCT/EP2004/053736.

* cited by examiner

*Primary Examiner*—Amare Mengistu
*Assistant Examiner*—Robert R Rainey
(74) *Attorney, Agent, or Firm*—Myers Bigel Sibley & Sajovec, P.A.

(57) ABSTRACT

A device is provided with a user interface, a control unit for controlling the operations of the device including changeable parameters of the user interface, and a game platform for running a game. The control unit is configured to change parameters of the user interface based on events occurring in the game.

35 Claims, 1 Drawing Sheet

DEVICE WITH GAME-DEPENDENT USER INTERFACE, METHOD, GAME MODULE AND COMPUTER PROGRAM PRODUCT THEREFOR

RELATED APPLICATIONS

The present application is a 35 U.S.C. §371 national phase application of PCT International Application No. PCT/EP2004/053736, having an international filing date of Dec. 30, 2004 and claiming priority to European Patent Application No. 04445006.2, filed Jan. 28, 2004 and U.S. Provisional Application No. 60/541,815 filed Feb. 4, 2004, the disclosures of which are incorporated herein by reference in their entireties. The above PCT International Application was published in the English language and has International Publication No. WO 2005/075038 A2.

FIELD OF THE INVENTION

The present invention relates to a device with a user interface that depends on a game, for instance a mobile device such as a mobile phone with a user interface that is adapted to change in dependence of game events. The invention also relates to a method for controlling such a device, and a corresponding game module.

STATE OF THE ART

Many modern electronic devices with big colour displays have themes or skins that give the user possibilities to set different graphical looks for the display. A certain number of themes, which is a set of bitmaps and colour settings together with animations and sounds, are acquired when the customer buys the phone but the customer can also create their own themes.

The graphics of the above-mentioned apparatuses is either static or can be changed actively by the user. On the other hand, many electronic devices are adapted to play games in addition to the normal functionality. Usually these games are provided with themes of their own which may be controlled by the user and are affected when playing the game, such as selecting characters, accessories and playing environment etc and reaching certain game levels. When playing the game and interacting with it the user causes the themes to be altered as the game evolves.

SUMMARY OF THE INVENTION

The present invention provides a link between the game environment and the device to take advantage of the game in order to create or adapt themes in the user interface of the device outside of playing the game, i.e. during the normal operation of the device.

In a first aspect the invention provides a device having a user interface, a control unit for controlling the operations of the device including changeable parameters of the user interface and further having a game platform for running a game.

According to the invention, the control unit is adapted to change parameters of the user interface in dependence of user interface parameters occurring in the game.

In a preferred embodiment, a theme with changeable parameters is defined for the user interface and at least one theme is associated with the game.

Different parameters of one theme may be associated with different levels of the game.

One theme may be associated with each level of the game.

Different parameters may be associated with different scores of the game.

Suitably, the control unit is adapted to change parameters of the user interface whenever the user interface parameters in the game are changing.

Preferably, the control unit is adapted to change parameters of the user interface when the game is interrupted.

The control unit may be adapted to change parameters automatically when the user exits the game.

The control unit may be adapted to change parameters by a user command.

The control unit may be adapted to be locked to by a user command to stop future changes of the parameters of the user interface.

Suitably, the device is adapted to save a changed user interface theme in a format that may be transmitted with a message to another device.

Suitably, the device is adapted to save a game score achieved by a user in a format that may be transmitted with a message to another device.

Said theme may include a set of: picture settings comprising picture parameters such as colour, contrast, light intensity; picture objects such as shapes and sizes of icons, cursors, fonts and backgrounds; animation effects and bitmap shapes; sound settings comprising sound parameters such as bass, treble and volume; sound objects such as signals and alarms consisting of sounds and melodies; as well as vibration settings comprising vibration parameters such as speed, amplitude and duration, said theme being associated with operations of the device.

In a preferred embodiment, the user interface comprises a display for showing information related to the operations of the device by means of a graphical interface of the display.

Preferably, the user interface comprises a sound system.

Suitably, the user interface comprises a vibration element.

The device may be a portable telephone, a pager, a communicator, a smart phone, an electronic organiser, a calculator or a positioning device.

In a second aspect the invention provides a method for providing a changeable user interface in a device having a user interface, a control unit for controlling the operations of the device including changeable parameters of the user interface and further having a game platform for running a game According to the invention, the control unit receives game related data from the game and uses said data in order to change parameters of the user interface.

In a preferred embodiment, a theme with changeable parameters is defined for the user interface and at least one theme is associated with the game.

Different parameters of one theme may be associated with different levels of the game.

One theme may be associated with each level of the game.

Different parameters may be associated with different scores of the game.

Suitably, parameters of the user interface are changed whenever the user interface parameters in the game are changing.

Preferably, parameters of the user interface are changed when the game is interrupted.

Parameters may be changed automatically when the user exits the game.

Parameters may be changed by a user command.

The control unit may be locked by a user command to stop future changes of the parameters of the user interface.

Suitably, a changed user interface theme is saved in a format that may be transmitted with a message to another device.

Suitably, a game score achieved by a user is saved in a format that may be transmitted with a message to another device.

Said theme may include a set of: picture settings comprising picture parameters such as colour, contrast, light intensity; picture objects such as shapes and sizes of icons, cursors, fonts and backgrounds; animation effects and bitmap shapes; sound settings comprising sound parameters such as bass, treble and volume; sound objects such as signals and alarms consisting of sounds and melodies; as well as vibration settings comprising vibration parameters such as speed, amplitude and duration, said theme being associated with operations of the device.

In a third aspect the invention provides a game module loadable into a device having a user interface, a control unit for controlling the operations of the device including changeable parameters of the user interface and further having a game platform for receiving and running a game associated with said game module.

According to the invention, the game module is adapted to transmit game related data from the game to the control unit in order to change parameters of the user interface in dependence of user interface parameters occurring in the game.

In a preferred embodiment, a theme with changeable parameters is defined for the user interface and at least one theme is associated with the game.

Different parameters of one theme may be associated with different levels of the game.

One theme may be associated with each level of the game.

Different parameters may be associated with different scores of the game.

Suitably, the game module is adapted to command a change of parameters of the user interface whenever the user interface parameters in the game are changing.

Preferably, the game module is adapted to command a change of parameters of the user interface when the game is interrupted.

Said theme may include a set of: picture settings comprising picture parameters such as colour, contrast, light intensity; picture objects such as shapes and sizes of icons, cursors, fonts and backgrounds; animation effects and bitmap shapes; sound settings comprising sound parameters such as bass, treble and volume; sound objects such as signals and alarms consisting of sounds and melodies; as well as vibration settings comprising vibration parameters such as speed, amplitude and duration, said theme being associated with operations of the device.

In a fourth aspect, the invention provides a computer program product loadable in a device and comprising software portions for implementing a game module as defined above.

In a fifth aspect, the invention provides a computer readable medium having a program product recorded thereon, wherein the program product comprises software portions for implementing a game module as defined above.

BRIEF DESCRIPTION OF THE DRAWINGS

The invention will be described in detail below with reference to the drawing, of which the only

DETAILED DESCRIPTION OF PREFERRED EMBODIMENTS

Figure 1:
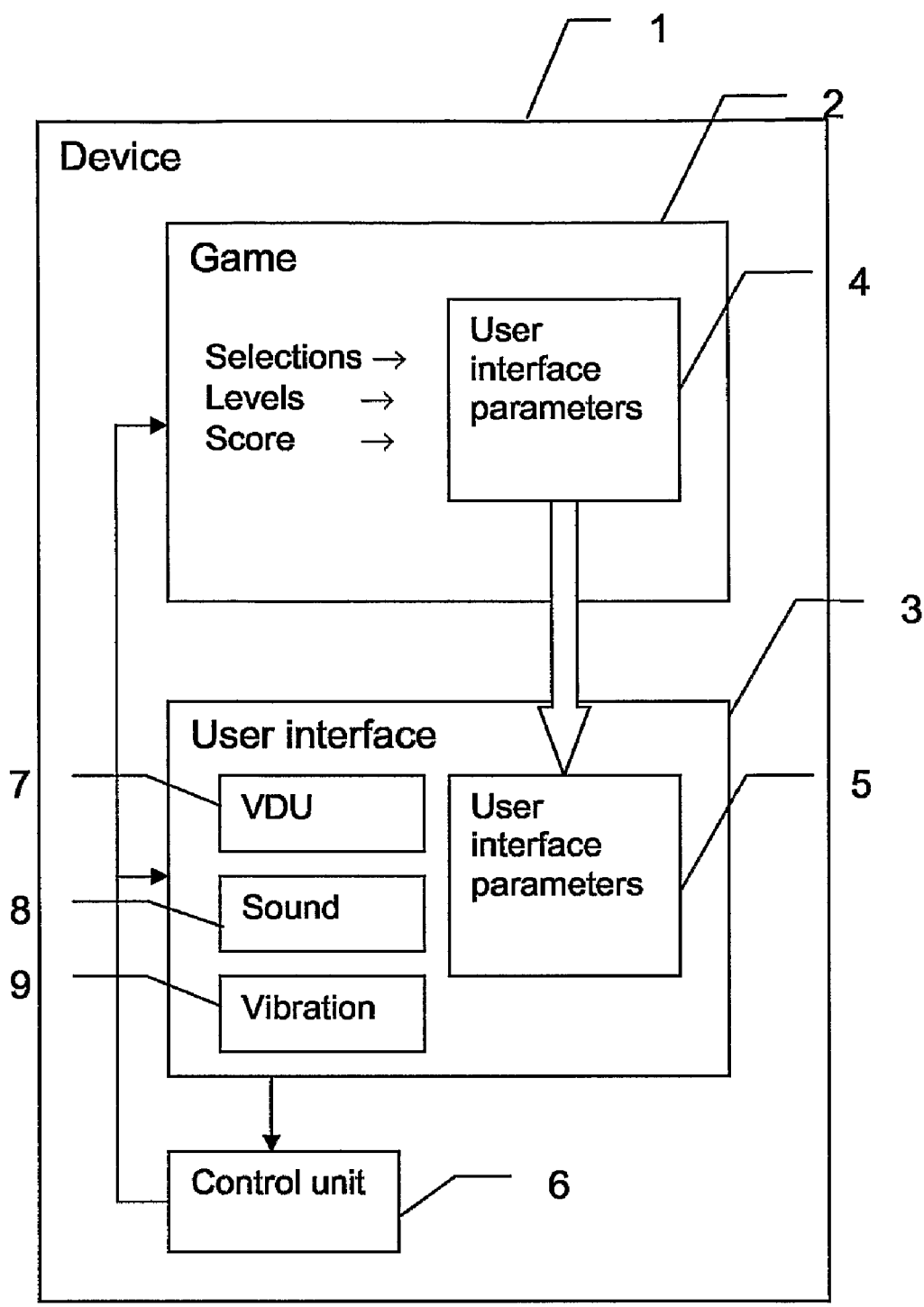
FIG. 1 is a schematic view of an embodiment of a device according to the invention provided with a game and a user interface.

The purpose of the present invention is to achieve a more interesting user interface, i.e. graphics and sounds, especially a user interface which is associated with a game, for instance in a mobile telephone. The invention is also applicable in other devices, generally all devices with a user interface and adapted to play games in addition to other functions of the device. Such devices include pagers, communicators, smart phones, electronic organisers, calculators, positioning devices and the like devices. The invention is best suited for handheld devices with reasonably large user interfaces, i.e. a liquid crystal display screen, usually a sound and vibration system and high processor capability.

The general functions and components of the device may be conventional and are not discussed here. Suffice it to say that the device includes a control unit having a processor controlling the usual operations of the device as well as the user interface of the display. The devices also has a platform for receiving and executing a game in addition to the normal utility functions if the device.

Themes, backgrounds and the entire user interface in various electronic devices such as mobile phones are becoming more and more graphically elaborate with a new generation of full colour displays. However, the graphics in today's mobile phones and other handheld devices are static and still not using many animated and lively effects. The graphics are controlled by the user in the sense that he can change themes, background picture etc, but the graphics do not interact with the user's environment. The present invention provides a more dynamic interface, semi-controlled by the user, which makes the electronic device livelier.

As used herein, a theme may include a set of picture settings comprising picture parameters such as colour, contrast, light intensity; picture objects such as shapes and sizes of icons, cursors, fonts and backgrounds; animation effects and bitmap shapes; various sound settings comprising sound parameters such as bass, treble and volume; sound objects such as signals and alarms consisting of sounds and melodies; as well as vibration settings comprising vibration parameters such as speed, amplitude and duration.

FIG. 1 shows an embodiment of the invention, schematically shown as a device 1 e.g. a mobile phone having a platform for receiving and running a game 2. The user interacts with the device through a user interface 3, i.e. a visual display unit, a sound system, a vibrator and a keyboard as is conventional. The operations of the device are controlled by a control unit 6. The look and feel of the device 1 manifest themselves through user interface parameters, usually one set of parameters 5 associated with the normal operations of the device and one set of parameters 4 used when the user is playing a game. The interface towards the user suitably comprises a visual display unit (VDU) 7, such as a liquid crystal display screen, a sound system 8 and a vibration element 9.

When playing a game, the user usually is able to choose from a variety of settings before starting to play. The user might have the possibility to choose an avatar of some sort, a course, entry level, a vehicle, weapons etc. The user will also be confronted with many different things during a game session. The user enters different levels with different looks and behaviours, takes different directions, chooses new weapons, meets new opponents, collects points etc. During this interaction with the game the user interface parameters 4 are changing, such as the graphics, different sounds and melodies play, vibrations might be used etc. When a gaming session is finished, either completely or "paused/saved", the user has scored a result of some sort, has reached a certain level, has conquered some specific opponent etc. Usually the user can also enter his signature in a high score list or the like.

The basic idea of the invention is to take advantage of the themes generated by the game when using the device also outside the strict gaming session. For instance, if the device 1 is a phone, when the user exits the game session to receive or place a call, the theme of the phone will have changed in response to events occurred in the game. For instance, if during the game the user reached a level in which the course took place in a forest, the user interface parameters 5 will also have been altered so that the colours of the theme are mainly green and the sounds have been changed to forest animals. At another level, the game took place at sea, in which case the colours are mainly blue and the sounds are splashing water like sounds etc. In one mode, the device is set to adopt the complete theme of the game at a certain level and use that in the operation of the device. In another mode, the device keeps the current theme as defined by some of the user interface parameters 5 but change certain parameters in accordance with the game parameters 4, e.g. colour scheme and fonts, thus only making a gradual adaptation of the themes of the device. Also, characters acting in a game and other symbols and signs can be used as a semi-transparent background as a part of a theme.

The themes as defined by the user interface parameters 5 may be changed automatically as the game evolves or semi-automatically when the user chooses to exit the game. The user may want to exit the game specifically to save a specific theme. The control unit 6 is adapted to change the parameters 5 of the user interface as soon as there is a change in the parameters 4 in the game. Alternatively, the control unit 6 is adapted to change the parameters 5 of the user interface only when the game is interrupted. The device is lockable so that the user may lock the device when he has generated a theme which he wants to use permanently. In this way, a user can create or generate unique themes through the gaming experience so that the device gets a dynamically changing user interface.

When a user has reached a particularly high score he may want to save this as a part of the theme shown on the display, especially in a design that is directly associated with the game itself. Such a view can also be saved in the device and signed by the user in order to send the score to friends for bragging and challenging them. The signature and the special design resulting from the game itself ensure that the high-score is a true result of the game and not tampered with.

Themes can be saved in the device for as long as the user wishes for use later or sending to other users. Themes and scores can for instance be saved in a suitable format to be sent through an MMS (Multimedia Message Service) over the mobile telecommunication network or uploaded on the Internet for sharing with other users, especially when the device is a mobile telephone.

Thus, the invention provides a device and method that gives the user the possibility to create new static interfaces or a dynamically changing interface, the dynamic aspect making the interface change as the game environment changes. Instead of designing a theme with an image-processing program, the user can create it by playing a game and importing user parameters automatically or controlled by the user. The invention may be implemented by various combinations of hardware and software as will be appreciated by a person skilled in the art. The scope of the invention is only limited by the claims below.

The invention claimed is:

1. A device, comprising:
    a user interface;
    a control unit for controlling operations of the device including changeable parameters of the user interface; and a game platform for running a game, wherein the control unit is configured to change the parameters of the user interface associated with operation of the device outside a game session whenever the parameters of the user interface associated with operation of the device within the game session in the game change based on events occurring in the game.

2. A device according to claim 1, wherein themes with changeable parameters are defined for the user interface and at least one of the themes is associated with the game.

3. A device according to claim 2, wherein different parameters of one of the themes are associated with different levels of the game.

4. A device according to claim 2, wherein at least one of the themes is associated with each level of the game.

5. A device according to claim 2 wherein the device is configured to save a changed user interface theme in a format that may be transmitted with a message to another device.

6. A device according to claim 2 wherein said theme includes a set of picture settings comprising picture parameters such as colour, contrast, light intensity; picture objects; animation effects and bitmap shapes; sound settings comprising sound parameters; sound objects vibration settings comprising vibration parameters, said theme being associated with operations of the device.

7. A device according to claim 1, wherein different parameters are associated with different scores of the game.

8. A device according to claim 7 wherein the device is configured to save a game score in a format that may be transmitted with a message to another device.

9. A device according to claim 1 wherein the control unit is configured to change parameters of the user interface when the game is interrupted.

10. A device according to claim 9, wherein the control unit is configured to change parameters automatically when a user exits the game.

11. A device according to claim 9, wherein the control unit is configured to change parameters by a user command.

12. A device according to claim 11, wherein the control unit is configured to be locked by a user command to stop future changes of the parameters of the user interface.

13. A device according to claim 1 wherein the user interface comprises a display for showing information related to the operations of the device by means of a graphical interface of the display.

14. A device according to claim 13, wherein the user interface comprises a sound system.

15. A device according to claim 14, wherein the user interface comprises a vibration element.

16. A device according to claim 1 wherein the device is a portable telephone, a pager, a communicator, a smart phone, an electronic organiser, a calculator or a positioning device.

17. A method for providing a changeable user interface in a device including a user interface, a control unit for controlling the operations of the device including changeable parameters of the user interface, and a game platform for running a game comprising:
    receiving game related data from the game at the control unit; and
    changing parameters of the user interface associated with operation of the device outside a game session whenever the parameters of the user interface associated with operation of the device within the game session changes based on events occurring during the game session.

18. A method according to claim 17, further comprising:
    defining themes with changeable parameters for the user interface; and
    associating at least one theme with the game.

19. A method according to claim 18, wherein different parameters of one of the themes are associated with different levels of the game.

20. A method according to claim 18, wherein at least one of the themes is associated with each level of the game.

21. A method according to claim 18 further comprising:
saving a changed user interface theme in a format that may be transmitted with a message to another device.

22. A method according to claim 18, wherein said theme includes a set of picture settings comprising picture parameters such as colour, contrast, light intensity; picture objects; animation effects and bitmap shapes; sound settings comprising sound parameters; sound objects; vibration settings comprising vibration parameters, said theme being associated with operations of the device.

23. A method according to claim 17, wherein different parameters are associated with different scores of the game.

24. A method according to claim 23, further comprising:
saving a game score achieved in a format that may be transmitted with a message to another device.

25. A method according to claim 17 further comprising:
changing of the user interface when the game is interrupted.

26. A method according to claim 25, further comprising:
automatically changing parameters of the user interface when the user exits the game.

27. A method according to claim 25, further comprising:
changing parameters of the user interface by a user command.

28. A method according to claim 27, further comprising:
locking the control unit by a user command to stop future changes of the parameters of the user interface.

29. A computer program product loadable in a device and comprising a computer readable medium having computer readable program code stored thereon for implementing a game module when the computer readable program code is run on the device, the game module comprising a user interface, a control unit for controlling operations of the device including changeable parameters of the user interface, and a game platform for receiving and running a game associated with said game module, further comprising game related data comprising the changeable parameters of the user interface associated with operation of the device within a game session, wherein the game module comprises:
transmission means for transmitting game related data from the game to the control unit; and
means for causing the control unit to change parameters of the user interface associated with operation of the device outside the game session whenever the parameters of the user interface associated with operation of the device within the game session change based on events occurring in the game.

30. A computer program product according to claim 29, wherein themes with changeable parameters are defined for the user interface and at least one of the themes is associated with the game.

31. A computer program product according to claim 30, wherein different parameters of one of the themes are associated with different levels of the game.

32. A computer program product according to claim 30, wherein at least one of the themes is associated with each level of the game.

33. A computer program product according to claim 29, wherein different parameters are associated with different scores of the game.

34. A computer program product according to claim 29, wherein the game module is configured to command a change of parameters of the user interface when the game is interrupted.

35. A computer program product according to claim 29, wherein said theme includes a set of picture settings comprising picture parameters such as colour, contrast, light intensity; picture objects; animation effects and bitmap shapes; sound settings comprising sound parameters; sound objects; vibration settings comprising vibration parameters, said theme being associated with operations of the device.

* * * * *